June 7, 1932.   C. L. GILSTRAP ET AL   1,862,079
SCISSORS
Filed March 30, 1931
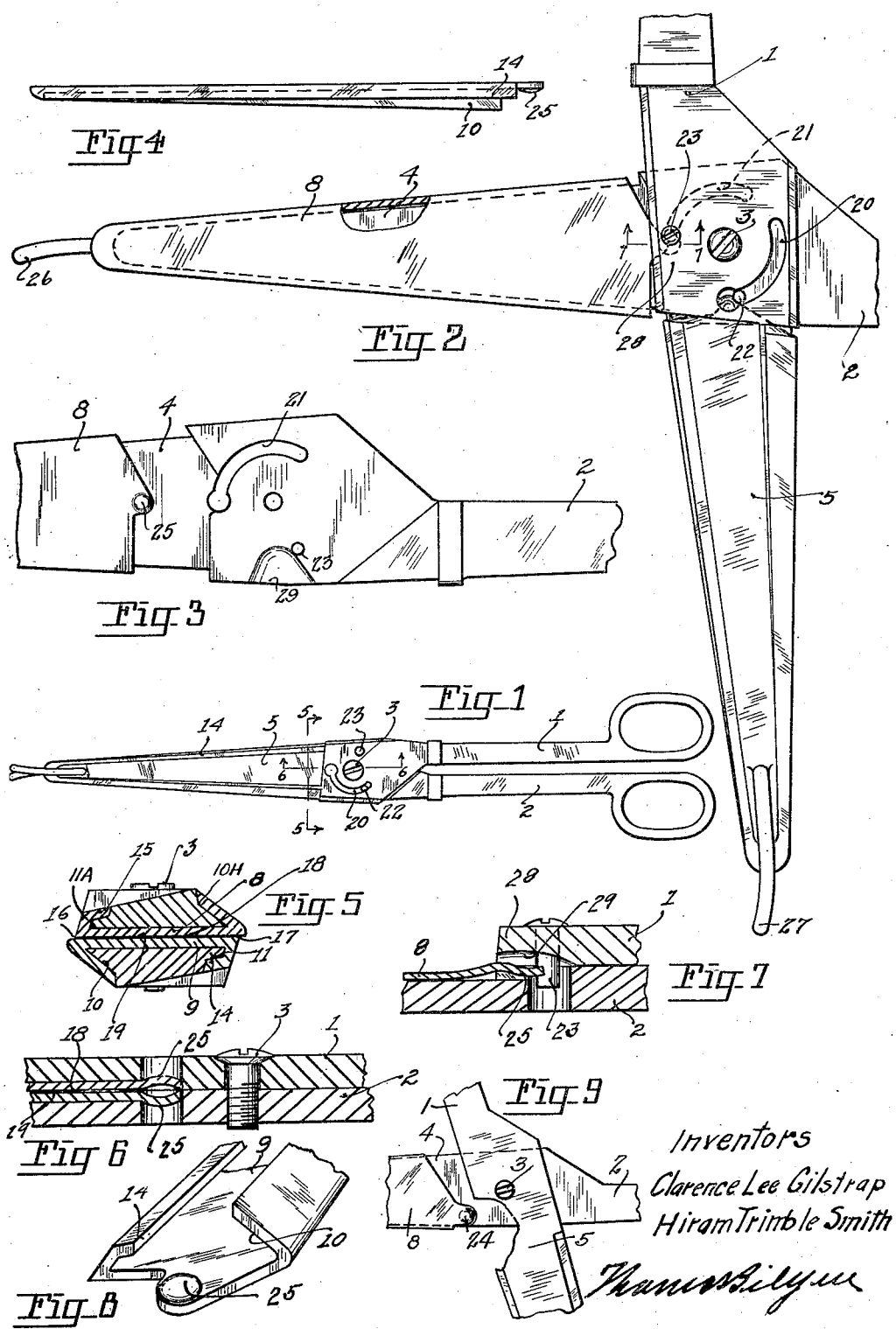
Inventors
Clarence Lee Gilstrap
Hiram Trimble Smith Patented June 7, 1932

1,862,079

UNITED STATES PATENT OFFICE

CLARENCE LEE GILSTRAP AND HIRAM TRIMBLE SMITH, OF LA GRANDE, OREGON

SCISSORS

Application filed March 30, 1931. Serial No. 526,306.

Our invention relates to scissors, shears and the like, and is particularly adapted for surgical use.

The object and purpose of our invention consists in providing removable blades for the shearing frame, so that a shearing blade may be provided of desired shearing quality, for the purpose intended. We thereby provide a shearing blade that may be removed and a pair of replacement blades that will be adapted for the purpose intended.

The device consists primarily of a scissor, or shear frame composed of two elements having the desired shape to which removable shear blades are adapted for being secured.

The two elements are pivoted and provide two handle members and two holding members. Each of the removable shear blades are preferably made of noncorrosive material and are adapted for precisely fitting the holding members. Locking teats are provided for securing the removable blades to the holding members.

Arcuate slots are provided within the face of each of the holding members and a pin is disposed within each face of the holding members. Each pin is adapted to ride within the arcuate slot disposed in the oppositely disposed holding member. Each of the arcuate slots has an enlarged opening at one of its ends which allow the pins to disengage the teats from the holding members when the scissor is opened to its fullest extent.

The purpose and object of our invention consists in providing a pair of holding members to which removable blades may be readily attached or detached.

A still further object of our invention consists in providing removable blades adapted for being secured to a pair of holding members that are specially designed to receive the same.

A still further object of our invention consists in providing a pair of removable blades having gauze tips formed integral therewith that may be used in the normal work of a surgeon in the use of the same.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a side view of a pair of shears shown with the meeting edges closed and illustrating the same in position for use and in which position the removable blades may not be detached from the scissor blanks, or frames.

Fig. 2 is a fragmentary, sectional side view of a pair of scissor frames illustrating the same in position for permitting the removal of the removable blades, adapted thereto.

Fig. 3 is a fragmentary, sectional side view of one of the blades illustrating the removable blade as being partially removed therefrom.

Fig. 4 is a side view of the removable blade shown removed from the scissor blank.

Fig. 5 is a fragmentary, sectional end view of the mechanism shown in Fig. 1, the same being taken on line 5—5 of Fig. 1, looking in the direction indicated.

Fig. 6 is a fragmentary, sectional, side view of the mechanism shown in Fig. 1, the same being taken on line 6—6 of Fig. 1, looking in the direction indicated.

Fig. 7 is a fragmentary, sectional, side view of the locking teat and the shaft, and illustrating the lip in position for being removed from the slot that locks the same, the same being taken on line 7—7 of Fig. 2, looking in the direction indicated.

Fig. 8 is a fragmentary, perspective end view of the innermost end of the removable blade, the same being shown removed from the scissor blanks.

Fig. 9 is a fragmentary, sectional, side view of a removable blade of a slightly modified form of construction.

Like reference characters refer to like parts throughout the several views.

We preferably form our device of two elements comprising handle members 1 and 2 and holding members 4 and 5. The two elements are pivotally supported about a screw, or rivet 3. Removable cutter blades made from specially hardened and specially prepared material are adapted for being removably disposed upon the holding members 4 and 5. These removable blade members may be made to meet the requirements of the user and in different forms, shapes and grades, but all adapted for being secured to common scissor frames comprising the two elements.

The removable blades of the scissors have oppositely disposed surfaces 8 and 9 that are parallelly disposed and normally spaced apart. Faces 10 10A, 11 and 11A are formed on the blades to uniformly taper from their tips to their engaging ends.

Locking lips 14 and 15 are adapted to engage the outside of the holding members, to thereby secure the removable blade thereto. The cutting edges 16 and 17 of the removable blade are adapted for being sharpened to a keen edge and the meeting surfaces 18 and 19 of the removable blades are adapted to precisely engage and rest upon each other.

Arcuate slots 20 and 21 are formed within the holding members and being uniformly spaced from the pivotal center of the respective members. While there is shown and described only arcuate slots, it is obvious that grooves may be used with equally good results and greater strength imparted to the whole body. We therefore do not want to be limited to the use of slots alone. A pin 22 is secured to the element 2 and is adapted to ride within the arcuate slot 20 disposed through the element 1 and a pin 23 is secured to the element 1 and is adapted to ride within the arcuate slot 21 disposed through element 2. Slot 20 has an enlargement 20A at one and slot 21 has a similar enlargement 21A at the same end.

Each of the removable blades has a teat 25 formed at its engaging end and as the blades are slipped upon the holding members into proper operating position, the teats engage with the enlarged portions of the arcuate slots and lock themselves in their respective arcuate slots. A shield 28, having a recess 29 disposed thereunder, is formed integral with the central body portion of each element. The shield is in the line of travel of the teats 25. The recess is so spaced that the teat cannot be disengaged from the arcuate slots as long as the scissor is not opened to its fullest extent. The teat can be released from the arcuate slots only when the scissor elements are opened to their maximum extent and when the pins 22 and 23 come in contact with the underside of each of the teats 25. When the elements have been opened to the fullest extent, the teats, pins and enlarged openings of the arcuate slots are in direct alignment. With the disengaging of the teats the blades can then be removed from their respective holding members.

In order to make our device more useful as an instrument in aiding a surgeon, we have provided gauze engaging tips 26 and 27 that are shown as made integral with the lower portions of holding members 4 and 5. It is believed obvious that these gauze engaging tips might be removably secured to the holding members and we therefore do not wish to be limited to the present disclosure.

A modified form of teat engaging means is shown in Fig. 9 wherein a cylindrical depression 24 is disposed within each of the holding members 4 and 5 into which teats 25 are adapted to be disposed. The removable blades will remain in position as long as the surfaces 8 and 9 are maintained in intimate contact with each other. The blades can be removed only when the scissor elements are opened to their fullest extent and thereby space apart the blade surfaces 8 and 9.

While the form of mechanism herein shown and described is admirably adapted to fulfill the objects primarily stated, it is to be understood that it is not intended to confine the invention to the forms of embodiment herein shown and described, as it is susceptible of embodiment in various forms, all coming within the scope of the claims which follow.

What we claim is:

1. In a device of the class described, the combination of a pair of scissor elements having a pair of holding members, removable blade members adapted to fit the holding members, an arcuate slot disposed through each of the holding members and relative to the center of rotation of the scissor elements, a teat inwardly extending from each of the removable blades, each of said teats being adapted to engage within the arcuate slots, a pin secured to each of the holding members, the pin of one holding member adapted to ride within the slot of the other holding member said pins adapted for engaging and raising the teats clear of the arcuate slot when the scissors are opened to their maximum extent about their common center of rotation.

2. In a device of the class described, the combination of a pair of scissor elements having a pair of holding members secured together about a common center of rotation, removable blades adapted to fit the holding members, means for locking the removable blades to the holding members and automatic means for unlocking the removable blades from the holding members when the scissor elements are rotated to their maximum extent about their common center of rotation.

3. In a device of the class described, the combination of a pair of scissor elements having a pair of holding members, a gauze engaging tip secured to each holding member, removable blades adapted for precise placement upon the holding members, means for locking the removable blades to the holding members and automatic means for unlocking the removable blades from the holding members when the scissor elements are opened at their pointed ends, a greater amount than they will be opened in the normal use of the scissors.

CLARENCE LEE GILSTRAP.
HIRAM TRIMBLE SMITH.